(No Model.)

G. B. RITTER.
COVER FOR JARS, &c.

No. 513,731.   Patented Jan. 30, 1894.

Witnesses
R. W. Bishop
Chas. A. Muzzy

Inventor
George B. Ritter,
By Alexander & Davis
Attorneys

UNITED STATES PATENT OFFICE.

GEORGE B. RITTER, OF NEW YORK, N. Y.

COVER FOR JARS, &c.

SPECIFICATION forming part of Letters Patent No. 513,731, dated January 30, 1894.

Application filed November 20, 1893. Serial No. 491,458. (No model.)

*To all whom it may concern:*

Be it known that I, GEORGE B. RITTER, a citizen of the United States, residing at New York, in the county of New York and State of New York, have invented certain new and useful Improvements in Covers for Jars, &c., of which the following is a specification, reference being had therein to the accompanying drawings.

This invention is designed to produce an extremely cheap and practical removable cover for vessels containing jellies, butter, lard, and other articles, the object being to display the contents of the vessel and at the same time exclude dust and insects, as is more fully hereinafter described.

Figure 1:
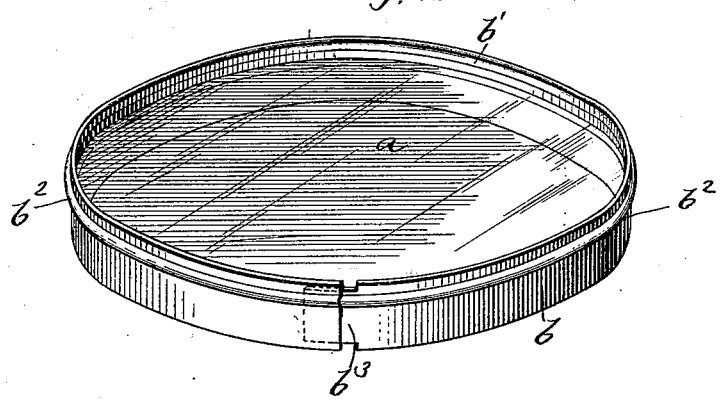
Figure 2:
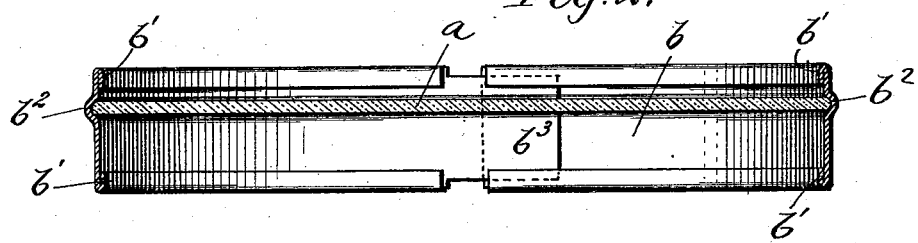
Figure 3:
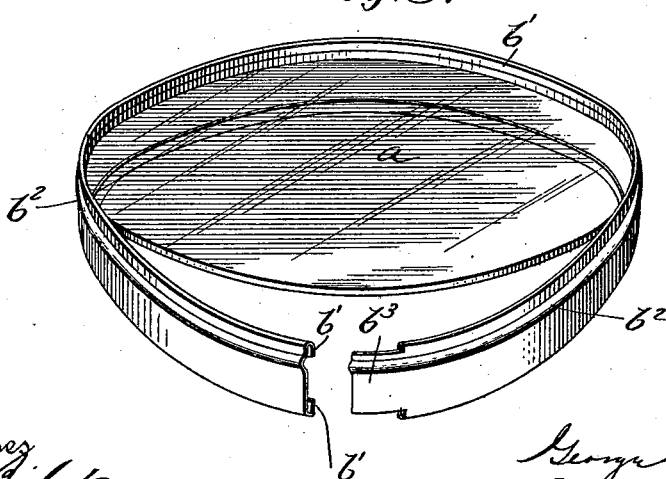

In the drawings, Figure 1 is a perspective view of the cover, Fig. 2 a sectional view, and Fig. 3 a perspective view showing more clearly the manner of constructing the cover.

Referring to the drawings by letters, $a$ is a disk of glass and $b$ a metal rim tightly embracing said disk. The rim consists of a narrow strip of sheet metal bent into circular form around the edge of the glass and having its upper and lower edges $b'$ bent over inwardly upon themselves. The edge of the glass disk rests in an annular groove $b^2$ formed in the rim near its upper edge by pressing a narrow portion of the metal bodily outward. The ends of the rim are joined by forming a tongue $b^3$ on one end and inserting said tongue in between the flanges $b'$ on the other end, the flanges forming a sort of socket for the reception and retention of the tongue, and then soldering the parts permanently together. The tongue is practically the same width as the rim, so as to form a part or extension thereof, and it will also be seen that the groove $b^2$ extends across the extension or tongue, thereby making the groove continuous all around the rim, which is necessary in order that the edge of the glass will be grasped at all points.

In making the cover, the glass is cut as nearly as possible the proper size; the rim is then fitted closely around the glass, the latter's edge resting in the groove and the tongue passing into the flanges; the ends of the rim are then soldered together. This construction makes a neat, strong display cover, the manner of holding the glass-disk enabling the same to be closely clamped and rigidly supported entirely around its edge. After the tongue is inserted in its socket the flanges are bent down closely against it so as to assist in clamping it in place.

Having thus fully described my invention, what I claim is—

1. A display cover, consisting of a glass-disk and a metal rim embracing the same, said rim consisting of a strip of sheet metal having its edges bent over inwardly and provided with an annular interior groove in which rests the edge of the disk, a tongue being formed on one end of the strip and inserted and secured in a socket formed by the flanges on the adjacent end, substantially as and for the purpose described.

2. A display cover, consisting of a disk of glass and a metal rim embracing the same, said rim consisting of a strip of sheet metal provided with an annular interior groove for the reception of the edge of the disk, said groove being formed by pressing a narrow portion of the metal bodily outward, one end of said strip being formed into a tongue overlapping the adjacent end and secured thereto, said groove extending across the tongue, substantially as and for the purpose described.

In testimony whereof I affix my signature in presence of two witnesses.

GEORGE B. RITTER.

Witnesses:
CHAS. T. SCRIBNER,
J. C. DE WINTER.